United States Patent

Smith, Jr.

[15] 3,640,850
[45] Feb. 8, 1972

[54] MULTISTAGE VAPOR-LIQUID CONTACT PROCESS FOR PRODUCING FRESH WATER FROM SALT WATER

[72] Inventor: Calvin S. Smith, Jr., El Cerrito, Calif.

[73] Assignees: Harrison W. Sigworth, Orinda; Thomas N. Finical, Jr., San Carlos, Calif., part interest to each

[22] Filed: Mar. 16, 1970

[21] Appl. No.: 19,592

[52] U.S. Cl. ............................203/11, 203/100, 203/22, 203/23, 203/24, 202/173, 202/185 A, 159/DIG. 17, 159/2 MS
[51] Int. Cl. ...........................................B01d 3/00, B01d 3/02
[58] Field of Search..........................230/11, 21, 22, 24, 100; 202/173, 185.2; 159/2; 210/21, 22

[56] References Cited

UNITED STATES PATENTS

| | | | |
|---|---|---|---|
| 2,749,094 | 6/1956 | Lewis et al. | 165/1 |
| 3,219,554 | 11/1965 | Woodward | 202/173 |
| 3,232,847 | 2/1966 | Hoff | 203/11 |
| 3,298,932 | 1/1967 | Bauer | 203/11 |
| 3,410,339 | 11/1968 | Wiegandt | 165/105 |
| 3,446,712 | 5/1969 | Othmer | 203/10 |
| 3,457,143 | 7/1969 | Kunst | 203/11 |
| 3,337,421 | 8/1967 | El-Roy | 203/11 |

*Primary Examiner*—Norman Yudkoff
*Assistant Examiner*—J. Sofer
*Attorney*—Gregg & Hendricson

[57] ABSTRACT

The invention is an improvement in distillation process for producing fresh water from salt water. The primary heat exchange is obtained by vaporizing a water immiscible fluid (such as a hydrocarbon) which boils at a temperature lower than water which is then recondensed by direct contact. Substantial simplification of plant, maintenance, etc. results. The invention is applicable generally to aqueous solutions of nonvolatile solutes, and to nonaqueous solutions of nonvolatile solutes.

12 Claims, 9 Drawing Figures

LEGEND:
SW — SALINE WATER
FW — FRESH WATER
IV — IMMISCIBLE VAPOR
IL — IMMISCIBLE LIQUID
WV — WATER VAPOR
BR — BRINE

INVENTOR.
Calvin S. Smith Jr.
BY Gregg & Hendricson

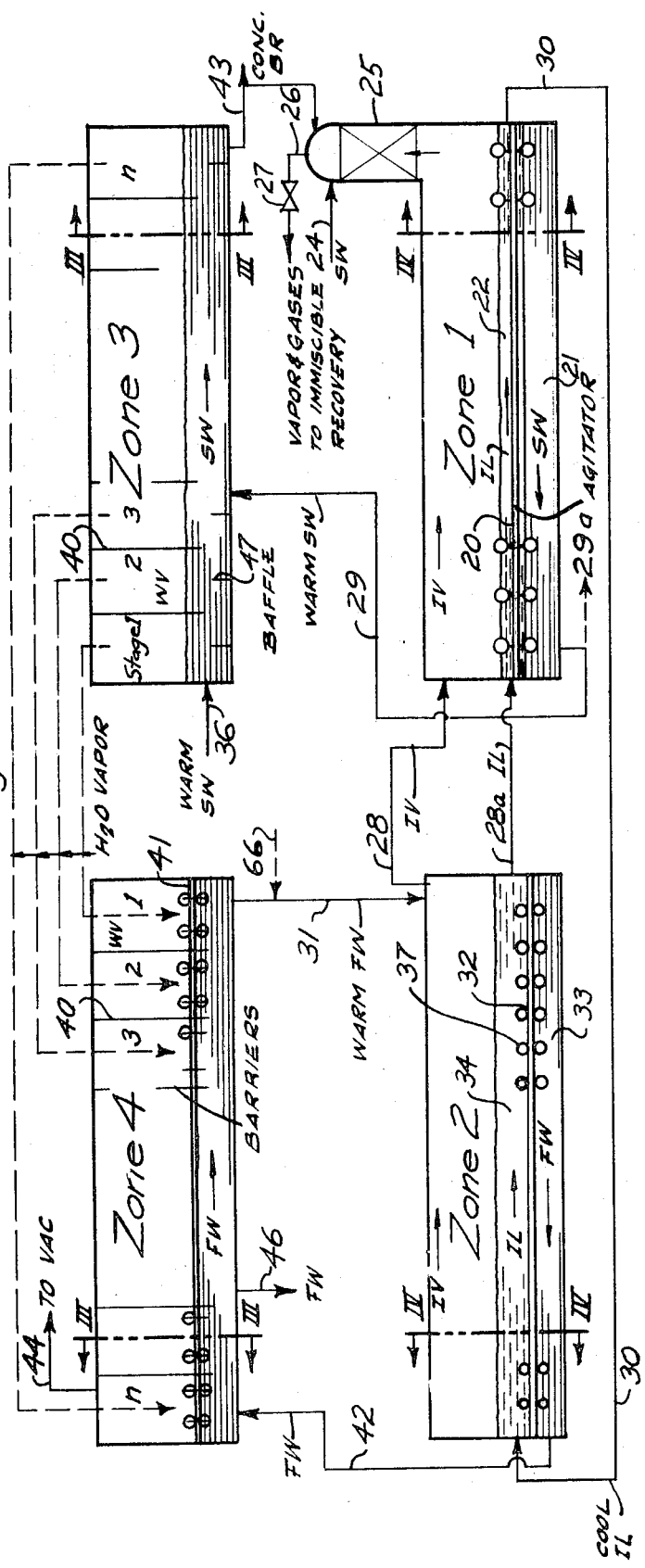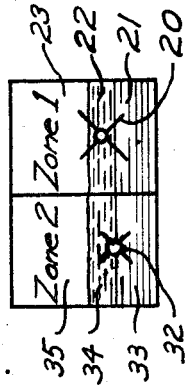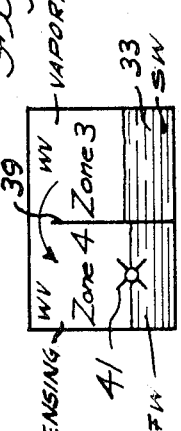

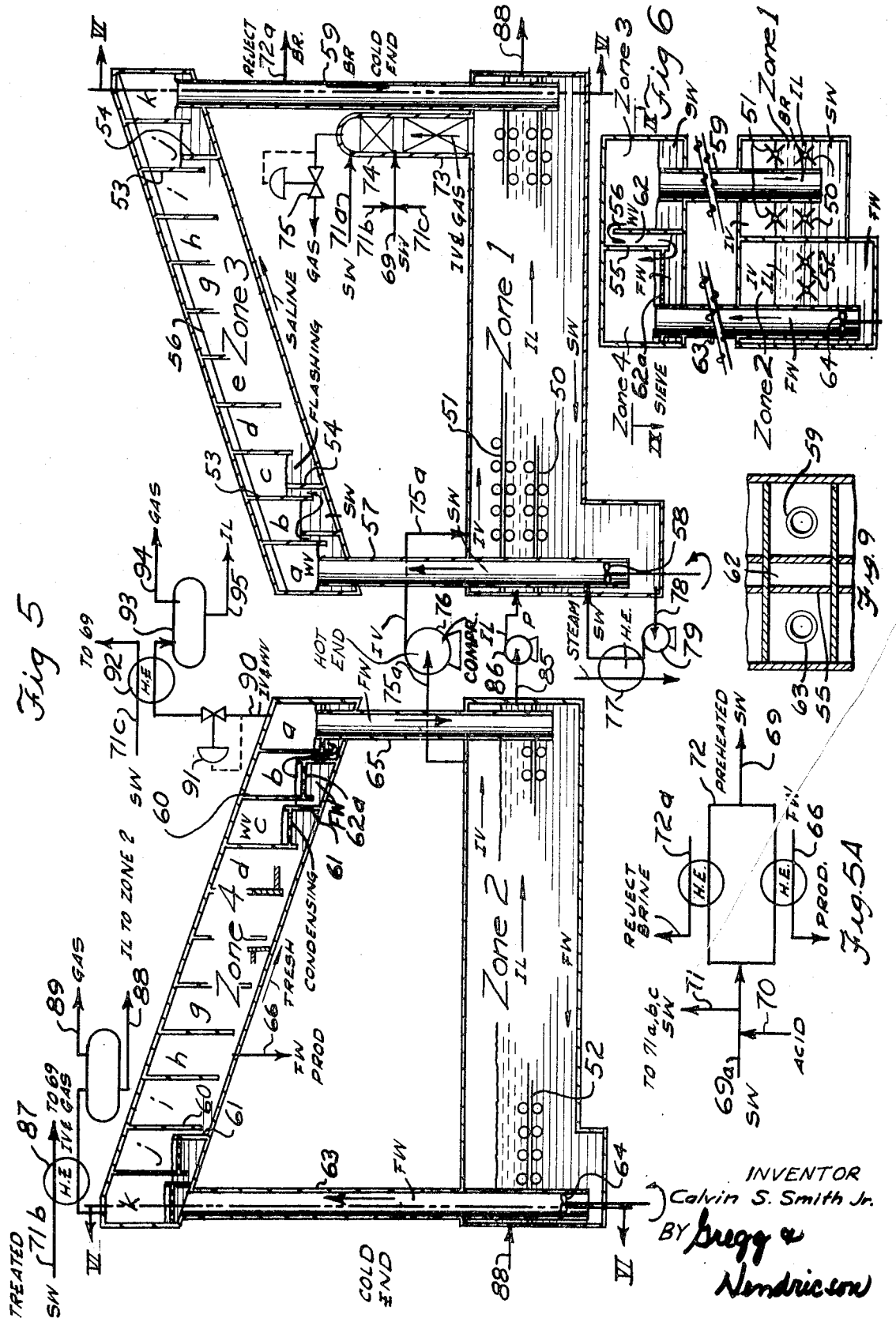

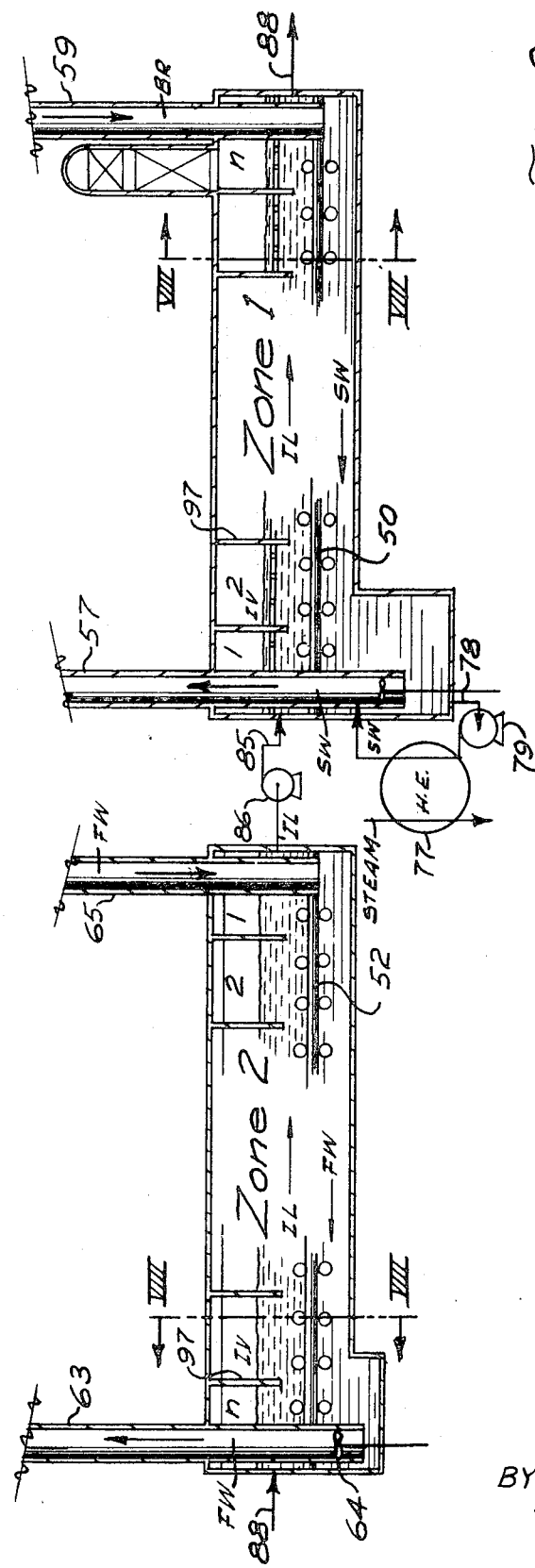
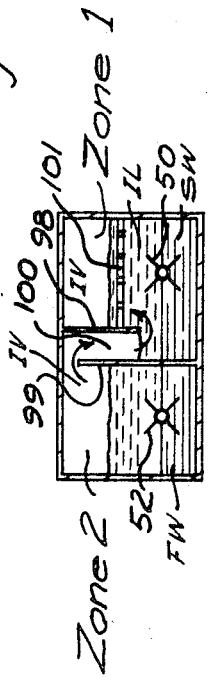
Fig 7
Fig 8
INVENTOR
Calvin S Smith Jr.
BY Gregg & Hendrickson

MULTISTAGE VAPOR-LIQUID CONTACT PROCESS FOR PRODUCING FRESH WATER FROM SALT WATER

BACKGROUND OF THE INVENTION

1. Field of the Invention

This invention is an improved process for the production of fresh water from salt water. (Other applications are discussed below). More particularly, this invention is an improvement on the long known distillation process for production of fresh water from salt water, said improvement eliminating a large proportion of the large heat exchange equipment requirements of the conventional process. Said improvements lead to an integrated process for the production of fresh water from salt water which is simple in concept and in equipment requirements; is susceptible to large scale plants; is low cost to operate; and does not require the construction of other large facilities such as a nuclear power plant to obtain low cost steam for economic operation.

2. Prior Art

In general, the leading processes for production of fresh water from salt water include the following:
1. Distillation, with which this invention is concerned.
2. Crystallization, either by freezing or by hydration.
3. Reverse osmosis.
4. Solvent extraction.

Of these processes, distillation seems to be the best with respect to cost, and quality of product, and has been the process selected by the United States Office of Saline Water for the design of the large prototype plants. There are three main types of plants for production of water by distillation, as follows:

1. Vapor Compression Distillation

In this type of plant, salt water is heated by exchange with the products and usually makeup steam to the process temperature. The salt water is then boiled, and the steam is then compressed (usually with a mechanical compressor) and is then used to boil the salt water in out-of-contact heat exchange, the steam being condensed as fresh water in out-of-contact heat exchange. This type of plant is (compared with some of the other plants) simple, and is efficient, and in small plants has had widespread application on ships as the Kleinschmidt still.

2. Multiple Effect or Long Tube Vertical (LTV) Process

Salt water is pretreated to reduce heat exchanger fouling and corrosion and is heated to about 250° F. with low pressure steam from a topping turbine in a power plant in out-of-contact heat exchange. The steam recovered by boiling salt water in the first stage is then used at a slightly lower pressure to boil salt water in the second stage. Steam from the second stage is used at slightly lower pressure and temperature to boil water in the third stage, etc. for five to 12 stages.

To reduce pressure drop, the salt water is pumped to the top of each stage where it falls on the inside wall of the exchanger tube as a film in concurrent flow with the vapor. Hence the name "long tube vertical." On the outside wall of the exchange tube, steam is condensed as a product fresh water.

3. Multistage Flash Vaporization

The multiple flash process (MSF) is complex but nevertheless appears to be the leading distillation process. Fresh salt water and recycle brine are preheated in out-of-contact heat exchange in successive stages by vapor from flashing salt water to about 250° F. and then by steam to about 260° F. The hot salt water is then flashed in 50 to 100 successive stages each at lower pressure, the steam being condensed as product by the beforementioned salt water being heated in tubes.

In addition to requiring expensive heat exchange, a disadvantage of this design is that failure of even one of the many tubes can shut down the plant. As salt water in the tubes is at higher pressure than the condensing fresh water, leakage is always salt water to fresh, and even minor leakage cannot be tolerated.

Certain problems are common to all processes which rely upon distillation. As will be shown the magnitude of these problems is greatly reduced by the present invention.

A major problem whose magnitude is greatly reduced by the present invention is the cost of heat transfer. About 10,000 B.t.u. of heat must be transferred for each gallon of fresh water produced by the distillation process. Prior processes generally use tubular heat exchangers constructed of metal tubes. The large heat transfer duty of these tubes requires a very large surface area, for example in excess of 5,000,000 square feet for a 50,000,000 gallon a day plant. Surface areas of such magnitude are expensive to install in the first instance and due to the corrosive and scale forming properties of sea water and brine, especially at the elevated temperatures involved, give rise to major problems and require costly pretreatment to alleviate corrosion and scale forming. The present invention greatly reduces surface areas subject to corrosion and scale forming.

Another problem is tube failure which is bound to occur due to one or more factors such as faulty material, faulty tube construction, faulty installation, stress, strain and water and tear during use, the corrosive action of sea water and electric, chemical and biochemical action. Tubes having very thin walls are employed to aid heat transfer, but such tubes are frail and are especially prone to failure. In a plant employing a large number of heat exchange tubes if a single tube fails it may shut down the entire plant or unit and the likelihood of failure of a single tube increases exponentially with the number of tubes. The present invention makes it possible to eliminate tubes completely in the major heat transfer areas and to greatly reduce the probability of failure that will shut down a plant or a unit.

Yet another problem with existing distillation methods is the problem of providing a cheap source of steam which matches the requirements of the distillation plant and is economical to use. Lower value steam from power plants such as from topping turbines in steam electric plants is proposed as an economical source of steam. Construction of a big water plant requires simultaneous construction of a big power plant. Moreover, the low pressure steam available at an electric plant is greatly variable from hour to hour as a power plant commonly operates at about 50 percent load factor. This means that the output of the distillation plant must vary with the output of the steam electric plant and that operation of the distillation plant will swing the performance of the power plant. In certain preferred embodiments of my invention steam from a power plant can be advantageously used. In a second preferred embodiment of my invention, a gas turbine can be used as a prime mover to operate compressors, pumps, etc., in the distillation plant; the waste heat of the turbine can be used for heat input directly and/or by way of a steam boiler and the gas turbine can be matched with the requirements of the distillation plant whereby the latter can be operated uniformly at an optimum rate.

General Description of the Invention

In accordance with the present invention heat exchange is effected by direct contact between an aqueous phase and a nonaqueous phase which is (1) lower boiling than water and (2) is immiscible with water. Preferably the nonaqueous phase has a substantially different density than water such that it will either float on top of a body of water or will sink beneath the water and cause the water to float on top. This facilitates separation of the two phases by gravity. Most advantageously the nonaqueous phase is substantially lighter in density than water.

For simplicity and clarity the nonaqueous phase will be referred to as "immiscible vapor" when it is in the vapor form, as "immiscible liquid" when it is in the liquid form and where the context requires reference to both phases it will be referred to as the "immiscible medium."

The immiscible medium may be a pure material such as pentane (which is lighter than water) or carbontetrachloride (which is heavier than water) or it may be a mixture of molecular species having a narrow boiling range or a rather wide boiling range. Mixtures may be simple mixtures such as pentane-hexane mixture or a more complex mixture such a mixture containing $C_4$, $C_5$, $C_6$ and $C_7$ paraffinic hydrocarbon. Examples of suitable immiscible media are as follows:

Normal and branched chain pentanes
Normal and branched chain hexanes
Normal and branched chain heptanes
Mixtures of any or all of the above
Mixtures of any of the above with normal or isobutane
Cyclohexane
Benzene
Mixtures of benzene and cyclohexane
Mixtures of any of the above paraffinic hydrocarbons or hydrocarbon mixtures with benzene, cyclohexane or mixtures of benzene and cyclohexane
Furan Among immiscible liquids that are more dense than water and which are suitable for purposes of the present invention are chloroform, carbontetrachloride, dichloromonofluoromethane.

In its general aspects, the process of the present invention is as follows:

1. Relatively cool sea water (or other aqueous solution of a nonvolatile solute) is brought into heat exchange relation with relatively warm or hot vapor of the selected immiscible medium whereby the immiscible vapor is condensed to immiscible liquid and the water is heated by the latent heat of the immiscible vapor. As will be apparent from the detailed description below, the aqueous solution may be brought into direct contact with immiscible vapor, or the aqueous solution may be covered by and in direct contact with a layer of immiscible liquid which in turn is in direct contact with immiscible vapor, but in either case latent heat is recovered by direct liquid vapor contact.

2. Heated water from (1) is caused to distill to provide fresh water vapor.

3. Immiscible liquid resulting from condensation of immiscible vapor in step (1) is directly contacted with heated fresh water to vaporize the immiscible liquid and produce immiscible vapor and to cool the fresh water. The immiscible vapor from this step is recycled to step (1).

4. Cooled fresh water resulting from step (3) is contacted with water vapor resulting from step (2) to condense the water vapor. A portion of the resulting fresh water is withdrawn as product and the remainder is recycled to step (3).

At one or more appropriate places in this system a heat input is provided, for example by conventional heat exchange using a tube-type heat exchanger with steam as the source of heat or by condensation of steam in the circulating fresh water, or by the use of a compressor to compress immiscible vapor or water vapor and raise its temperature or by using a warm salt water stream from a power plant, or by using warm sea water near the surface in certain areas of the ocean. A combination of two or more such means of heat input may be employed.

The invention will now be described in more detail with reference to the accompanying drawings in which:

FIG. 2 is a similar diagrammatic illustration showing certain mechanical features;

FIG. 3 is a view in vertical cross section taken along line III—III of FIG. 2 showing a suitable physical relationship between the salt water distillation zone (zone 3) and the fresh water vapor condensing zone (zone 4);

FIG. 4 is a view in vertical cross section taken along the line IV—IV of FIG. 2 showing a suitable physical relationship between the salt water-immiscible vapor zone (zone 1) and the fresh water-immiscible liquid zone (zone 2);

Figure 1:
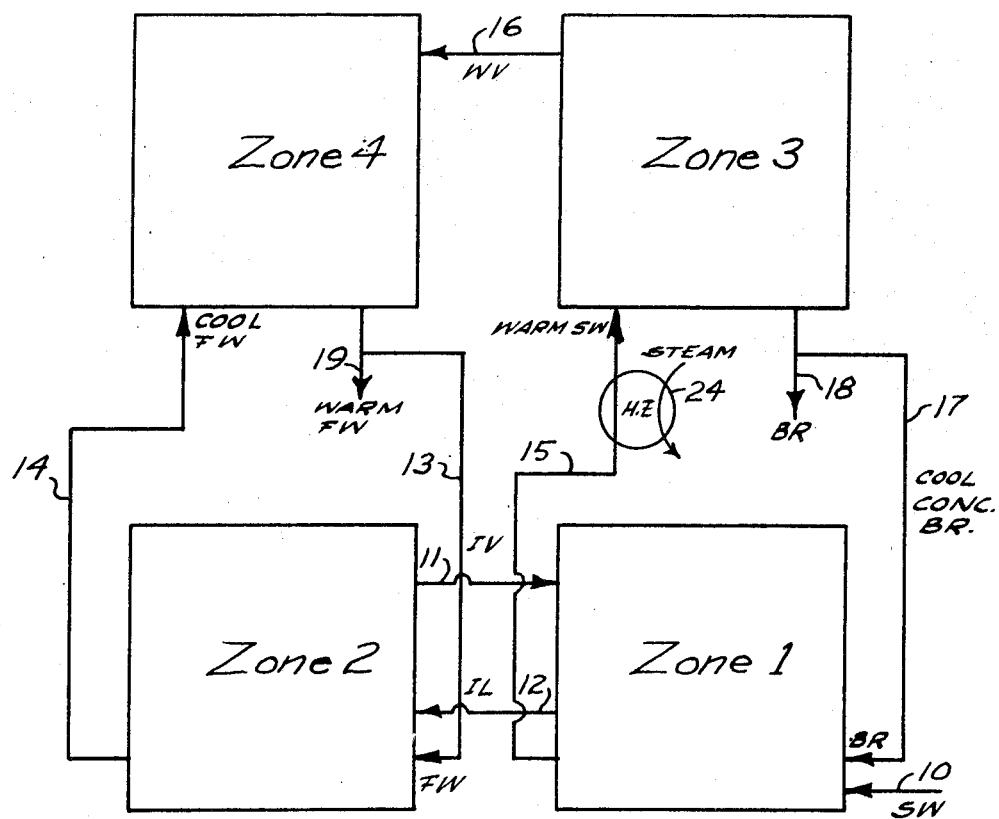
FIG. 1 is a simplified diagrammatic illustration of the process of the invention.

The various zones are shown unfolded in FIG. 2 for purposes of clarity and in FIGS. 3 and 4 they are shown in actual physical relationship;

FIG. 5 is a somewhat diagrammatic illustration of yet another embodiment of the invention;

FIG. 5A is a diagrammatic view showing how saline water is pretreated, preheated, etc. This figure is to be considered in relation to FIG. 5. Lines common to both figures bear the same reference numerals.

FIG. 6 is vertical cross-sectional view taken along the line VI—VI of FIG. 5, showing the physical relationship of the various zones;

The various zones are shown unfolded in FIG 5 for purposes of clarity and in FIG. 6 they are shown in actual physical relationship;

FIG. 7 is a partial view of a variant of FIG. 5;

FIG. 8 is a vertical cross-sectional view taken along the lines VIII—VIII of FIG. 7;

FIG. 9 is a horizontal transverse view of the upper part of FIG. 6 taken on the line IX—IX.

The zones are shown unfolded in FIG. 7 for purposes of clarity and in FIG. 8 they are shown in actual physical relationship.

In the drawings certain fluids are identified by lettered symbols which are identified by a legend on the same sheet of drawings as FIG. 1 and which are set forth below for convenience of reference:

LEGEND

| Symbol | Meaning |
| --- | --- |
| SW | Saline water |
| FW | Fresh water |
| IV | Immiscible vapor |
| IL | Immiscible liquid |
| WV | Water vapor |
| BR | Brine |

Referring now to FIG. 1, four zones are shown which are identified as zones 1, 2, 3 and 4. Sea water enters zone 1 by line 10 and immiscible vapor enters by line 11. The immiscible vapor is hotter than the sea water and is condensed by direct contact with the sea water (or with a body of immiscible liquid which in turn is in direct contact with sea water), thereby giving up sensible heat and latent heat to the sea water and raising the temperature of the latter. As a result the immiscible vapor is condensed to form immiscible liquid which flows though line 12 to zone 2 wherein it is heated and revaporized by direct contact with warm fresh water entering through line 13. This results in vaporizing the immiscible liquid and cooling the fresh water. The immiscible vapor is recycled through line 11 to zone 1 and cooled fresh water passes to zone 4 through line 14 for utilization as described below.

Heated sea water produced in zone 1 leaves by line 15 and distills in zone 3 (a zone of lower pressure) to produce vapor of fresh water which leaves by line 16. The remaining cooled sea water or brine is recycled to zone 1 by line 17. A portion of this effluent brine is removed from the system by line 18 to prevent excessive accumulation of the salts and other solids in the system. The fresh water vapor produced in zone 3 is led to zone 4 by line 16 where it is directly contacted with cold fresh water produced in zone 2 and which is introduced into zone 4 by line 14. This results in condensation of water vapor and warming of the fresh water effluent from zone 2. This warm water is recycled by line 13 to zone 2 and a portion is withdrawn through line 19 as product.

It is, of course, necessary to provide a heat input. Such heat input may take any one or more of several forms. As shown, a heat exchanger 24 may be installed in line 15, for example a tube-type heat exchanger wherein the sea water is passed through tubes in a jacket in countercurrent relation to steam flowing through the jacket. Alternatively, immiscible vapor in line 11 may be compressed or water vapor in line 16 may be compressed. Alternatively, steam may be condensed in line 13. Alternatively, in areas where warm sea water is available near the surface and it is practical to obtain cold sea water at a depth of about 1,000 feet not too distant from the coast, surface sea water may be employed as a source of heat input. Cold sea water will be used to condense immiscible vapor. This embodiment (use of cold sea water from a deep source and a warm surface sea water) is described below with reference to FIG. 2. Other methods of heat input may be used and combinations of several methods may be employed.

It will be apparent that certain marked advantages are provided by the system of FIG. 1. Heat transfer occurs in zone 1 between immiscible vapor and sea water in zone 2 between immiscible liquid and fresh water. Such heat transfer is accomplished by direct vapor-liquid contact, therefore heat transfer surfaces such as metal tubes are unnecessary. Since it is the latent heat of condensation of the immiscible vapor (which is relatively very large) rather than sensible heat (which is relatively quite small) which provides the bulk of the heat transfer, a large amount of heat can be transferred without large temperature differentials and without having to transfer excessively large volumes of liquid and gas.

Referring now to FIGS. 2, 3 and 4, zones 1, 2, 3 and 4 there shown correspond to similarly numbered zones of FIG. 1. That is, in zone 1 sea water is heated by condensation of immiscible vapor; in zone 2 immiscible liquid from zone 1 is vaporized by direct contact with hot fresh water; and in zone 3 sea water heated in zone 1 is distilled to produce fresh water vapor which is condensed in zone 4 by contact with cold fresh water from zone 2.

Zone 1 is shown with an agitator 20 such as a rotatable shaft having mixing blades or paddles fixed thereto at intervals. As shown in FIGS. 2 and 4, zone 1 contains a bottom layer 21 of sea water, a layer of immiscible liquid 22 overlying the sea water and an immiscible vapor space 23 above the immiscible liquid. The agitator 20 may be confined to the interface between the liquid phases and closely adjacent areas. Alternatively, the immiscible liquid layer may be absent or very thin and the agitator 20 may be located so as to intermix sea water with immiscible vapor. Factors which govern this choice are discussed below. The agitator 20 is rotated by any suitable means (not shown) to promote direct contact between the two liquid phases or between immiscible liquid and immiscible vapor and to bring about efficient, rapid heat exchange between the two phases such that the immiscible vapor is condensed and gives up its sensible and latent heat to the sea water thereby raising the temperature of the sea water. Cold sea water enters zone 1 through line 24. The sea water passes through a packed section 25 where it is contacted with immiscible vapor vented from zone 1 and is stripped of dissolved gases. The mixture of immiscible vapor and gases is vented through line 26 and valve 27 and immiscible liquid is recovered by suitable means and is restored to the system. Immiscible vapor enters the opposite end of zone 1 through line 28 and flows from left to right whereas sea water flows from right to left as viewed in FIG. 2. Therefore, countercurrent flow of sea water and immiscible vapor are provided. Intimacy of contact and efficiency of heat transfer are promoted by agitator 20. Warm salt water leaves zone 1 through line 29 and is treated as described hereinbelow.

At the right-hand end of zone 1 immiscible liquid resulting from condensation of immiscible vapor by cold sea water is withdrawn through line 30 and is introduced into one end of zone 2. Warm fresh water is introduced into the other end of zone 2 through line 31. Zone 2 is equipped with a mixing device 32 similar to the mixing device 20 in zone 1. Flow of immiscible liquid and fresh water are countercurrent. Heat exchange between the immiscible liquid and fresh water is effected in zone 2, thereby vaporizing immiscible liquid, producing immiscible vapor and cooling the fresh water.

As in the case of zone 1, zone 2 contains a bottom layer 33 of liquid aqueous phase (in this case fresh water) an overlying layer 34 of immiscible liquid and an immiscible vapor space 35 above the immiscible liquid. As in zone 1, the agitator 32 is confined to the interface between the liquid phases 33 and 34 and closely adjacent areas. Alternatively, the immiscible liquid layer 34 may be very thin and the agitator 32 may be located so as to intermix water directly with the vapor, but it is preferred to maintain a sufficiently deep layer of immiscible liquid to prevent this and to minimize evaporation of water in zone 2.

The immiscible vapor produced in zone 2 is recycled through line 28 to zone 1. Inasmuch as it is not desirable to evaporate all of the immiscible liquid in zone 2 the unevaporated residue of immiscible is transferred through line 28a to zone 1.

Warm sea water having zone 1 through line 29 is introduced into zone 3. Makeup sea water, which is suitably warmed e.g., because it is taken from the surface of the sea in an area where the surface temperature is high or because there has been a heat input such as from power plant condensers is also introduced into zone 3 through line 36.

Zones 3 and 4 are shown as consisting of $n$ stages. Typically $n$ may have a value of one to 100. Referring to FIG. 3, in which one of the stages of these zones is shown in elevation, a continuous barrier 39 is provided between the stages to prevent mixing of the liquids in the two stages but to allow water vapor (and some immiscible vapor) to pass between. Each stage is separated from adjacent stages by a barrier 40 (see FIG. 2) which extends from the top of the two zones downwardly but not to the bottom. A contacting device 41, which may be the same as or similar to the mixing device 20 in zone 1, is provided in zone 4. As sea water moves in zone 3 from left to right it distills and water vapor (and some immiscible vapor) so produced in each stage passes to and is condensed in the corresponding stage of zone 4. Such condensation is aided by contacting device 41. The condensing medium is cold fresh water that leaves zone 2 through line 42. Sea water that has been heated in zone 1 by the sensible and latent heat of immiscible vapor is introduced into an appropriate stage of zone 3 wherein the temperature of the sea water flowing in line 29 matches the temperature of sea water flowing in zone 3. Brine is removed from the system through line 43, part of which may be recycled to zone 1 through line 24. A vacuum is applied to zone 4 through line 44 and the vapors (uncondensed water vapor and immiscible vapor) are treated in a recovery system to recover and recycle the immiscible liquid. Fresh water is removed from zone 4 and recycled to zone 2 through line 31. A portion of the fresh water is removed as product through line 46. Baffles 47 are provided in zone 3 to promote turbulence and assist vaporization of water.

Referring now to FIGS. 5 and 6, zones 1, 2, 3 and 4 correspond to similarly numbered zones of the preceding figures, i.e., in zone 1 the latent and sensible heat of immiscible vapor is employed to heat sea water; in zone 2 the sensible heat of fresh water is employed to vaporize immiscible liquid; in zone 3 sea water is distilled and in zone 4 the vapor of fresh water produced in zone 3 is condensed by contact with liquid fresh water. A more elaborate and flexible system is provided than in the apparatus of the preceding figures. Briefly describing the structure of FIGS. 5 and 6; Zone 1 is equipped with a mixing device 50 to promote contact of immiscible liquid and sea water and with a second mixing device 51 to promote contact of immiscible vapor with immiscible liquid. Zone 2 is provided with a mixing device 52 to promote contact between fresh water and immiscible liquid. Zone 3 is divided into stages (indicated as $a$ to $k$ but the number of stages may vary from plant to plant) by baffle pairs 53, 54 (see FIG. 5). Continuous spaced baffles 55, 56 separate zone 3 from zone 4 (see FIG. 6). Effluent heated salt water from zone 1 travels up a leg or stand pipe 57 with the aid of a low pressure pump or impeller 58. Sea water that has been partly distilled in zone 3 is recycled to zone 1 through leg or stand pipe 59. Zone 4 is divided in corresponding stages $a$ through $k$ by spaced baffle pairs 60, 61. The spaced baffles 55, 56 (see FIG. 6) that separate zone 3 from zone 4 provide channels 62 to communicate the respective stages and permit passage of water vapor (and some immiscible vapor) from zone 3 to zone 4. Intimate contact of such vapor and liquid water is obtained by vapor distributors such as sieve trays or bubble cap trays 62a.

Fresh water that has been cooled by evaporation of immiscible liquid in zone 2 rises through leg or stand pipe 63 with the aid of a low pressure pump or impeller 64 to zone 4 and serves to condense water vapor in zone 4. The resulting fresh water is recycled to zone 2 through leg or stand pipe 65. A portion of this circulating fresh water is withdrawn, as product at 66.

A heat input is, of course, required. This heat liquid may take any one or more of several forms, several of which are described below with reference to FIG. 5.

The system as thus far described as certain advantages. For example, in zone 1 sea water flows countercurrently to immiscible liquid. Heat exchange between these phases is promoted by mixing device 50. The layer of immiscible liquid acts as a seal and applies a hydrostatic pressure which prevents substantial contact of the liquid water phase with the largely immiscible vapor phase, therefore minimizes the partial pressure of water vapor in the largely immiscible vapor phase by impeding WV flow into the IV phase. Mixing device 51 promotes heat exchange contact between the immiscible vapor and immiscible liquid phases. The immiscible liquid entering zone 1 through line 85 and immiscible vapor entering through line 75a contain a maximum of high boiling components at a temperature greater than the temperature of the SW at that point and therefore transfers heat to the SW. Preferably, the system of FIG. 5 employs an immiscible liquid having a fairly large boiling range, e.g., boiling between about 80° and 170° F. and is a mixture such as gasoline having a rather uniform, continuous distribution of low, high and intermediate boiling constituents such that the boiling point curve approximates a straight line. Therefore, there is a minimum temperature difference at any point between immiscible vapor phase and immiscible liquid phase and between immiscible liquid phase and liquid water phase. This condition provides efficiency in that the change in entropy is minimized.

Similarly in zones 3 and 4 (although they are physically separated) flow of fresh water entering in cold condition at 63 and sea water entering in hot condition at 57 is countercurrent and the temperature difference from each stage in zone 3 to the corresponding stage of zone 4 is small e.g., about 1° to 4° F. The large open channels 62, see FIGS. 6 and 9, provide minimum pressure drop from zone 3 to zone 4. Direct contact with a bubbling device permits design for low temperature differences. Therefore, change in entropy between zones 3 and 4 is minimized.

Moreover, advantage is taken of hydrostatic pressure differentials such that energy for pumping is kept to a minimum. As heated sea water ascends through leg 57 its hydrostatic head diminishes. Therefore, when it reaches stage a of zone 3 it will flash and yield an increment of water vapor and will cool slightly. As the sea water proceeds up the "ladder" of zone 3 at each succeeding stage its hydrostatic head diminishes somewhat and a further increment of water vaporizes and the residual unvaporized water is reduced slightly in temperature. The lowest hydrostatic head is exerted at the upper end of the ladder, which corresponds with the lowest boiling temperature. As the concentrated sea water or brine descends through leg 59 its hydrostatic head increases thereby restoring the head lost in leg 57 and in the ladder of zone 3. Therefore the head required at pump 58 is principally limited to frictional losses. Similarly on the fresh water side of the apparatus, loss of hydrostatic pressure in leg 63 is restored to a major extent as the fresh water goes down the "ladder" and through leg 65.

Certain advantages adjuncts of the system just described will now be described.

Sea water enters the system through line 69. In conventional desalination plants in which there is a large amount of heat exchange it is desirable to heat the incoming sea water to minimize scale formation. Because of the much lesser amount of heat exchange and heat exchange surfaces in the present system, pretreatment of the sea water is not as important. Nevertheless it may be employed and is illustrated in FIG. 5A. Thus sulfuric acid in suitable amounts, e.g., 60 to 120 parts per million of sea water, is introduced by line 70. Suitable mixing means (not shown) may be used to mix the acid uniformly with the sea water. A portion of the treated cold sea water is withdrawn through line 71 for various purposes as described below. The balance (and the major portion) of the treated cold sea water is then passed through a heat exchanger system 72 wherein it is in heat exchange relation with reject brine that has been withdrawn from the system through line 72a and with product water that leaves the system through line 66. This heat exchange system provides several advantages as follows: (1) it transfers waste heat to the incoming sea water thereby conserving the heat input to the system; (2) it cools the hot brine which is desirable because the dumping of hot brine into the ocean or a stream is undesirable and may kill fish or other marine or plant life; and (3) the hot product water is cooled for storage, transfer and/or use. All these objectives are accomplished by the heat exchange system just described and illustrated. The heat exchanger may be of any desired type and if the brine is hotter than the product water or vice versa the heat exchanger may be arranged accordingly so that there is countercurrent flow of incoming cold sea water and reject brine and product water in a thermal sense to preheat the SW.

The treated and heated sea water proceeds then through line 69 to a contacting zone 73, such as a packed column and proceeds countercurrently to a stream of gas and vapor from zone 1 containing uncondensed immiscible vapor and carbon dioxide, nitrogen and oxygen. This strips the sea water of its dissolved gases and condenses immiscible vapor vented from zone 1. The sea water (and immiscible liquid resulting from condensation of immiscible vapor) then pass into zone 1 for countercurrent flow with respect to and heating by condensing immiscible vapor as described above. Effluent vapor and gas from zone 73 passes through a zone 74 where it is contacted by a countercurrent stream of cold sea water conducted to this zone by a branch of line 71 identified by the reference numeral 71a. This cools the effluent vapor-gas mixture which is vented through a pressure reducing valve 75. The vented gas may be subjected to an additional vapor recovery step if desired, e.g., by refrigeration or absorption by a solid or by a liquid solvent to recover any uncondensed immiscible medium for recycling to the system.

Immiscible vapor passing from zone 2 to zone 1 through line 75a may be compressed by compressor 76 thereby providing a heat input to the system. Another source of heat input, which may be an alternative to or an addition to the compressor 76, is a heat exchanger 77 through which condensing steam may be passed and through which a portion of the circulating sea water in leg 57 may be passed by way of a line 78 and pump 79.

Immiscible liquid from zone 2 is pumped through line 85 by pump 86 to zone 1 for ease of control and assurance of similar liquid compositions in zone 1 and zone 2. The proportion of immiscible liquid thus transferred is, however, small compared to that which is vaporized.

A portion of the treated cold salt water removed from line 69 by way of line 71 is passed through a branch line 71b to a heat exchanger 87 for the primary purpose of condensing immiscible vapor that is vented from the upper end of leg 63 or from stage k of zone 4. This condenses the vapor into immiscible liquid which is returned by line 88 to zone 2. Uncondensed gas and vapor are removed by line 89 to a vacuum system. At the lower end of the ladder of zone 4, in zone a thereof, in which the hottest vapor from zone 3 is condensing, immiscible vapor and water vapor are vented through line 90 and a pressure reducing valve 91 and are passed through a heat exchanger 92 where they are cooled by a portion of the cold treated sea water taken from line 71 by line 71c. Immiscible liquid resulting from condensation of immiscible vapor in heat exchanger 92 is separated from gases in vessel 93. The gases are vented through line 94 and the condensate of immiscible liquid is returned to the system through line 95. Sea water diverted through lines 71b and 71c is returned to line 69 and the rest of the system. The heat exchange-condensation systems shown at 87–89 and 92–95 serve also to separate the small amount e.g., about 20 to 100 parts per million) of immiscible liquid dissolved and entrained in the water in ducts 57 and 63.

As stated above, the immiscible liquid may be a simple molecular species such as pentane, or a mixture of molecular species having a very narrow boiling range, or it may be a mixture having a wide boiling range and a fairly uniform distribution of molecular species such that the boiling point curve approximates a straight line. Referring to FIG. 5, an important advantage of an immiscible liquid such as gasoline having a wide boiling range and a uniform distribution of molecular species is that the temperature from inlet line 59 to outlet line 57 of zone 1 is large, and there is a larger yield of distilled water per pass through zone 3 which reduces the size of certain equipment, particularly pump 58, and the volume requirements for phase separation. The same advantages also occur in zone 2 and zone 4. A disadvantage of a wide boiling immiscible liquid is that more water vapor is vaporized along with the immiscible liquid in zones 1 and 2 if water is present at the immiscible liquid-vapor interface. I have found, however, that vaporization of water can be suppressed by operating with a substantial layer of immiscible liquid in zones 1 and 2, and designing mixers 50 and 52 carefully to provide good agitation of the water and immiscible liquid phases for heat transfer, but to avoid swirling water to be gas-liquid interface. Use of a wide boiling range immiscible liquid is particularly important in designs according to FIG. 5 in which compressor 76 is to be minimized or eliminated, because thermal efficiency is promoted significantly by as wide a spread as possible between the inlet and outlet temperatures of each of the zones. This preferred design would have application with low pressure, low cost steam from a power plant.

With compressor 76 maximized in plants that have no other external energy source, and particularly with gas turbine energized plants, the advantages of a wide boiling immiscible liquid are less. If the maximum boiling point of the immiscible liquid is 60° to 80° F. less than that of water, the amount of water that is vaporized in zone 2 with the immiscible liquid is tolerable. In such a system a thin layer of immiscible liquid can be maintained in zones 1 and 2 and the mixing may occur at or near the interface of the liquid and vapor phases. An immiscible liquid with a 20° to 40° F. boiling range results in a good compromise on circulation rate and thermal efficiency, and results in good stability of operation and is particularly attractive in small plants where the complexity of numerous stages in zones 3 and 4 is undesirable. By use of a very narrow boiling immiscible liquid or a pure species the number of stages in zones 3 and 4 can be reduced to 1 to 4, and bubble trays may be substituted for the agitators in zone 1, which represents a further simplification.

Heat input to the system has been described in various ways, such as compression of immiscible vapor by compressor 76 and indirect heat exchange in heat exchanger 77. It is also possible to provide a heat input in other ways alternative to or in addition to the heat inputs described. Thus, the heavy ends of immiscible liquid pumped by pump 86 through line 85 from zone 2 to zone 1 may be boiled in a suitable still (not shown) thereby providing a heat input; or the water descending through pipe 65 may be heated by any suitable means (not shown); or heat exchanger 87 may be replaced by a compressor and the compressed water vapor returned to the system by condensing it in stage $a$ of zone 4.

Yet another means of heat input is as follows: Stage $k$ of zone 3 and stage $a$ of zone 4 are modified to eliminate the channels 62 connecting them to corresponding stages of the other zone; water vapor from stage $k$ of zone 3 is compressed by a suitable compressor; the compressed water vapor is introduced into stage $a$ of zone 4, and steam is injected into this compressed water vapor, which is then returned to the circulating fresh water in the fresh water side (zones 2 and 4 and pipes 63 and 65) of the system. This would eliminate the need for heat exchanger 77. The makeup energy source for the process of FIGS. 5 and 6 can vary depending upon local availability of fuels. In areas where natural gas is available, the gas turbine is an especially economical source of energy. The gas turbine is the prime mover for compressor 76. The hot exhaust gas from the gas turbine is passed through a waste heat boiler for recovery of high pressure steam. The high pressure stem is used in topping turbines to drive the pumps and agitators in the process and provide additional horsepower on the compressor 76. The exhaust steam from the topping turbines is used as makeup heat on exchanger 77. In this design, compressor 76 would be large, and the heat input to exchanger 77 relatively small. Immiscible liquid may be either narrow boiling or wide boiling depending upon the engineering choice of plant simplicity or reduced circulation.

If the energy source is residual fuel oil or coal or nuclear fuel which cannot be advantageously utilized in a gas turbine, high pressure steam is raised in a conventional boiler. If the steam plant is for the exclusive use of the desalination plant, compressor 76, and pumps and agitators are driven with steam topping turbines, with exhaust steam being used in exchanger 77. If the desire is to run the steam plant for generation of electricity by steam topping turbines, compressors 76 can be entirely dispensed with, but the need for steam in exhanger 77 increases. A wide boiling immiscible liquid is important to reduced energy requirements.

To those skilled in the art, it will be apparent that a great many different designs are available within the spirit of this invention, and that the optimum for any one design will vary depending upon numerous local considerations such as the source of fuel, and desire for electric power.

In FIG. 7, a modification to zones 1 and 2 is shown to illustrate design changes if the compressor 76 is absent. In this design each of zones 1 and 2 is divided into 1 to $n$ corresponding stages by vertical baffles 97 from the ceiling and dipping into the immiscible liquid but not to the interface between immiscible liquid and water. Spaced continuous baffles are provided at 98 and 99 (FIG. 8) which provide a vapor passage 100 between each stage of zone 2 and the corresponding stage of zone 1. Immiscible vapor flows through each such passage and through a gas-liquid contactors 101 in the respective stage of zone 1. The contactors 101 may be sieve trays, or bubblers of various designs as shown in FIG. 8. By this means good point-to-point correspondence of immiscible liquid-vapor composition can be obtained enhancing condensation. This open design reduces pressure drops, and hence temperature differences and hence efficiency is increased. Vapor velocities are decreased and hence less entrainment and a purer product result. Without the compressor, minimum circulation is more important. A wider boiling range immiscible liquid is required. A wider boiling range implies that part of the immiscible liquid will boil nearer water. This in turn increases the need to operate with the water phase substantially buried under the immiscible liquid phase to suppress vaporization of water. Thus in FIG. 7 agitators 52 and 50 are shown at a deep interface and will be designed to mix the water and immiscible liquid, with phase separation before the immiscible liquid is circulated to the gas-liquid interface.

In another embodiment of my invention the heat exchange involved in heat exchanger 72 of FIG. 5 is greatly reduced or entirely avoided, the treatment of sea water with acid as shown at 70 is greatly reduced or entirely avoided and additional brine is converted to fresh water. This embodiment employs the joint operation of the system of FIG. 2 and the system of FIG. 5 (hereinafter referred to as FIG. 2 and FIG. 5). This joint operation will now be described with reference to FIGS. 2 and 5 and associated figures. Lines interconnecting the two systems are shown in the drawings.

Sea water is taken from the sea (with preliminary filtration or settling if necessary to separate coarse solid impurities) is introduced into zone 1 of FIG. 2 and is caused to flow countercurrently, as described above, to the flow of immiscible vapor and condensate thereof, such immiscible vapor being preferably that of a wide boiling range (e.g., 50° to 180° F.) immiscible liquid such as a hydrocarbon mixture. The effluent, heated sea water is not, however, passed through line 29 to zone 3 of FIG. 2 but passes instead through line 29a, thence to inlet line 69 of FIG. 5 but without passing through a heat exchanger 72 and without introduction of acid through line 70. That is the preheated sea water from zone 1 of FIG. 2 is introduced directly into contacting zone 73 of FIG. 5. (If some heat input by conventional methods and/or if some treatment with acid is desired, the preheated sea water from zone 1 to FIG. 2 may be passed through a heat exchanger similar to but much smaller than that at 72 in FIG. 5A and/or a quantity of acid, but much less than that introduced at 70 in FIG. 5A may be added and mixed in).

The two systems (FIG. 2 and FIG. 5) are operated as described above but with the following differences: The heat input to FIG. 5, as stated, is preheated sea water from FIG. 2. The input to zone 3 of FIG. 2 is the hot brine withdrawn at 72a from FIG. 5. Hot fresh water withdrawn from FIG. 5 at 66 is introduced into FIG. 2 through line 31. Product fresh water is withdrawn with FIG. 2 through line 46 as described above.

The invention has been described in detail with reference to immiscible liquids that are lighter than water. The same principles apply with reference to immiscible liquids that are heavier than water except that account must be taken of the fact that the aqueous and immiscible liquid layers are reversed. Referring to FIG. 2, immiscible vapor (of immiscible liquid heavier than water) enters zone 1 through line 28 and is condensed therein and sinks to the bottom. Meanwhile seal water moves countercurrently but as an upper layer. The two liquid phases and the vapor phase are mixed by agitator 20. Layers 21 and 22 are reversed. In zone 2, immiscible liquid, removed from zone 1 through line 30, whose inlet is appropriately relocated, enters the left end of zone 2 (through line 30, connected lower than indicated in FIG. 2) and proceeds to the right as the bottom phase countercurrently to heated fresh water moving to the left. The two liquid phases are mixed by agitator 32. Immiscible vapor passes upwardly into the vapor zone of zone 2.

It will be noted that certain immiscible liquids indicated as suitable for purposes of the present invention are quite low boiling. For example, normal pentane boils at 97° F. These low boiling immiscible liquids are, nevertheless, useful in the practice of the invention either per se or as the low boiling components of a wide boiling mixture. Thus, pressure is maintained in the sea water preheating zone 1. For example in the system of FIG. 5 the pressure in zone 1 may be 65 p.s.i. and the pressure may diminish to a few pounds per square inch at the top of the ladder of zone 3. The long legs 57 and 59 act as pressure seals between the high and low pressure zones and, as described, the hydrostatic pressure in leg 59 restores most of the pressure that is lost in going up leg 57 and the ladder.

The descriptions above with reference to FIGS. 2 and 5 relates to the use of a constant pressure in zone 1 and a constant pressure in zone 2. It is possible however to modify these zones to employ a varying pressure. For example, zones 1 and 2 can be modified or include stages as in zone 3 or zone 4 of FIG. 5 (with or without vapor communication between individual stages of zone 1 and zone 2). In such modified construction, a narrow boiling, an intermediate boiling or a wide boiling range immiscible liquid may be employed.

It will therefore be apparent that a novel and very useful method of desalinating sea water is provided. The process is applicable not only to sea water but also to other salt water sources such as salt water brines, brackish inland waters, etc. The method may be used in processes where the main product or a byproduct is the solute, e.g., salt, other minerals, etc. The method is also applicable to the concentration by evaporation of weak liquors such as waste sulfate liquors in the paper industry, liquors of aluminum sulfate, ammonium sulfate, etc.

I claim:

1. A cyclic process of heat transfer for effecting separation of water from an aqueous solution of a nonvolatile solute (SW), which comprises the following steps:
    a. effecting heat transfer between said solution (SW) and the condensing vapor (IV) of water immiscible liquid (IL) which has a lower boiling point than water and is hotter than the solution (SW) to transfer latent heat of condensation of the vapor (IV) to the solution (SW) to thereby heat the solution (SW) and condense the vapor (IV), such heat transfer being effected by at least one of the following methods: (1) direct contact of the vapor (IV) with the solution (SW) and (2) direct contact of the vapor (IV) with its condensate (IL) and thence by direct contact of the condensate (IL) with the solution (SW);
    b. separating heated solution (SW) produced in step (a) from the contact mixture of solution (SW) and condensate (IL) of immiscible vapor (IV) and flash evaporating the separated heated solution (SW) produced in step (a)
    c. condensing water vapor (WV) from step (b) by direct contact with cooler fresh water (FW)
    d. withdrawing as product part of the fresh water (FW) produced in step (c)
    e. effecting direct contact between (1) another part of the fresh water (FW) produced in step (c) and (2) condensate (IL) from step (a) to vaporize said condensate (IL) and cool the water,
    f. recycling vapor (IV) from step (e) to step (a) and recycling cold water (FW) from step (e) to step (c)
    g. withdrawing from the process at least a portion of the concentrated solution (SW) produced in step (b) and
    h. providing heat input to the system to separate solvent from solute and to make up for heat losses.
2. The process of claim 1 wherein the immiscible liquid is a hydrocarbon liquid (IL).
3. The process of claim 2 wherein the hydrocarbon liquid has two or more molecular species and has a substantial boiling range.
4. The process of claim 2 wherein the hydrocarbon liquid has a narrow boiling range.
5. The process of claim 2 wherein the aqueous solution is sea water.
6. A process according to claim 1 wherein heat is introduced into the system by at least one of the following methods: (1) compressing the vapor (IV) of immiscible liquid (IL); (2) compressing the vapor of water (WV); (3) direct injection of steam; and by (4) indirect heat exchange between a fluid circulating in the system and a heated fluid external to the system.
7. A process according to claim 6 wherein a portion of heat input to the system is by compression of at least one of the vapors (IV) and (WV), another portion of the heat input is by at least one of the methods consisting of direct injection of steam and indirect heat exchange of steam with a circulating circulating liquid phase, a gas turbine is employed to operate a compressor to provide said compression and waste heat from the gas turbine is used to produce steam which is used for the aforesaid steam heat input.
8. A process of producing fresh water from saline water which comprises the following steps:
    a. providing a first zone for heat exchange between the vapor (IV) of a water immiscible liquid (IL) and saline water (SW), a second zone for heat exchange between fresh water (FW) and water immiscible liquid (IL), a third zone for flash evaporation of saline water (SW) and a fourth zone for condensation of vapor (WV) of fresh water (FW),
    b. introducing into said first zone saline water (SW) and the vapor (IV) of a water immiscible liquid (IL), said vapor (IV) being hotter than the saline water (SW), said immiscible liquid (IL) having a lower boiling point than water, being less dense than water and having a substantial boiling range
    c. causing countercurrent flow of said vapor (IV) and said saline water (SW) in the first zone and causing condensation of the vapor (IV) and resulting heating of the water (SW) therein by at least one of the following means: (1) direct contact between vapor (IV) and saline water (SW) and (2) direct contact between vapor (IV) and its condensate (IL) and transfer of heat by direct contact of condensate (IL) and saline water (SW), d. separating and withdrawing from the first zone immiscible liquid (IL) resulting from condensation of vapor (IV) and also withdrawing heated saline water (SW), e. introducing the heated saline water (SW) withdrawn from the first zone into the third zone and introducing immiscible liquid (IL) withdrawn from the first zone into the second zone, f. flash vaporizing heated saline water (SW) in the third zone and introducing the resulting water vapor (WV) into the fourth zone.

g. recycling unevaporated saline water (SW) from the third zone to the first zone, h. condensing water vapor (WV) in the fourth zone by direct contact with colder fresh water (FW), i. withdrawing fresh water (FW), including water vapor condensate produced therein from the fourth zone and introducing it into the second zone, j. effecting countercurrent flow and contact of immiscible liquid (IL) and fresh water (FW) in the second zone, thereby vaporizing immiscible liquid (IL) and cooling fresh water (FW), k. withdrawing cooled fresh water (FW) from the second zone and introducing it into the fourth zone to condense water vapor (WV) therein and withdrawing vapor (IV) of immiscible liquid (IL) from the second zone and introducing it into the first zone, l. withdrawing as product a portion of the fresh water (FW) circulating between the second and fourth zones and withdrawing a portion of the saline water (SW) circulating between the third and first zones, and m. providing heat input to the system to separate solvent from solute and to make up for heat losses.

9. The method of claim 8 wherein the hot liquid saline water (SW) introduced into the third zone and the cool liquid fresh water (FW) introduced into the fourth zone are caused to flow in such manner that, as water vapor (WV) is distilled from each portion of the third zone it condenses in a portion of the fourth zone wherein the temperature of the liquid fresh water (FW) is only slightly lower than the temperature of the saline water (SW) in the aforesaid portion of the third zone.

10. The process of claim 8 wherein the immiscible liquid is a halocarbon.

11. The method of claim a wherein a substantial depth of immiscible liquid (IL) is maintained above the liquid aqueous phase in the first and second zones to seal the latter from the vapor phase.

12. The method of claim 11 wherein agitation is provided to promote contact of the liquid phases with one another but to minimize contact of the liquid aqueous phases with the vapor phases.

* * * * *